United States Patent [19]

Satoh

[11] Patent Number: 4,767,158

[45] Date of Patent: Aug. 30, 1988

[54] RECLINING MECHANISM

[75] Inventor: Seiki Satoh, Utsunomiya, Japan

[73] Assignee: Mitsui Kinzoku Kogyo Kabushiki Kaisha, Tokyo, Japan

[21] Appl. No.: 69,969

[22] Filed: Jul. 6, 1987

[30] Foreign Application Priority Data

Jul. 10, 1986 [JP] Japan .............. 61-106158[U]

[51] Int. Cl.$^4$ .............................. A47C 1/00
[52] U.S. Cl. .................. 297/367; 297/368; 403/388
[58] Field of Search ............... 297/367, 368; 403/13, 403/14, 388

[56] References Cited

U.S. PATENT DOCUMENTS

| 32,094 | 4/1861 | Traxler | 403/388 |
| 1,057,928 | 4/1913 | Briggs | 403/388 |
| 3,415,554 | 12/1968 | Papayoti | 403/388 |
| 3,901,100 | 8/1975 | Lida et al. | 297/367 |
| 4,146,267 | 3/1979 | Mori et al. | 297/367 |
| 4,337,978 | 7/1982 | Kazaoka et al. | 297/367 |
| 4,611,853 | 9/1986 | Lehmann et al. | 297/367 |

FOREIGN PATENT DOCUMENTS 63750 6/1975 Australia .............. 403/388

Primary Examiner—Francis K. Zugel
Attorney, Agent, or Firm—Stevens, Davis, Miller & Mosher

[57] ABSTRACT

A reclining mechanism for a seat of an automotive vehicle in which a back bracket is pivoted with a pivot pin to a seat bracket of a seat in an automotive vehicle.

An angle of inclination of the back bracket relative to the seat bracket is adjusted and maintained by a sector gear locking pawl engagement mechanism.

Raised portions are formed along the peripheral sides of the mounting surface remote from a locking pawl of the back bracket upon which is attached the sector gear in such a way that the raised portions abut against a portion of the circumferential surface of the sector gear and the sector gear and the back bracket are securely joined together with joint pins.

1 Claim, 3 Drawing Sheets

4,767,158

RECLINING MECHANISM

BACKGROUND OF THE INVENTION

The present invention relates to a reclining mechanism and more particularly to a reclining mechanism for a seat of an automotive vehicle in which a back bracket is pivoted with a pivot pin to a seat bracket of a seat in an automotive vehicle and an angle of inclination of the back bracket relative to the seat bracket is adjusted and maintained by a sector gear-locking pawl engagement mechanism.

In the conventional reclining mechanisms, a sector gear is attached to a lower end of a back-seat bracket and a seat bracket is provided with a locking pawl whose toothed portion is made into engagement with the sector gear. The angle of inclination of a back rest is adjusted by varying a degree of the engagement of the toothed portion of the locking pawl with the sector gear. Such reclining mechanisms have some problems as will be described in detail below.

SUMMARY OF THE INVENTION

In view of the above, the primary object of the present invention is to provide a reclining mechanism which can substantially overcome the above and other problems encountered in the prior art reclining mechanism and in which a sector gear can be securely joined to a back bracket with a less number of rivets.

To the above and other ends, in a reclining mechanism of the type in which a back bracket is swingably pivoted with a seat bracket; a sector gear whose center coincides with the axis of the pivot pin is securely attached to the back bracket; and the angle of inclination of a back rest is adjusted by the engagement between the toothed portion of the sector gear and the toothed portion of a locking pawl, the present invention is characterized in that raised portions are formed along the peripheral sides of the mounting surface remote from the locking pawl of the back bracket upon which is attached the sector gear in such a way that the raised portions surround a portion of a circumferential surface of the sector gear; and the sector gear and the back bracket are securely joined together with joint pins.

The above and other objects, effects and features of the present invention will become more apparent from the following description of a preferred embodiment thereof taken in conjunction with the accompanying drawings.

DETAILED DESCRIPTION OF THE PREFERRED EMBODIMENT

Figure 4:
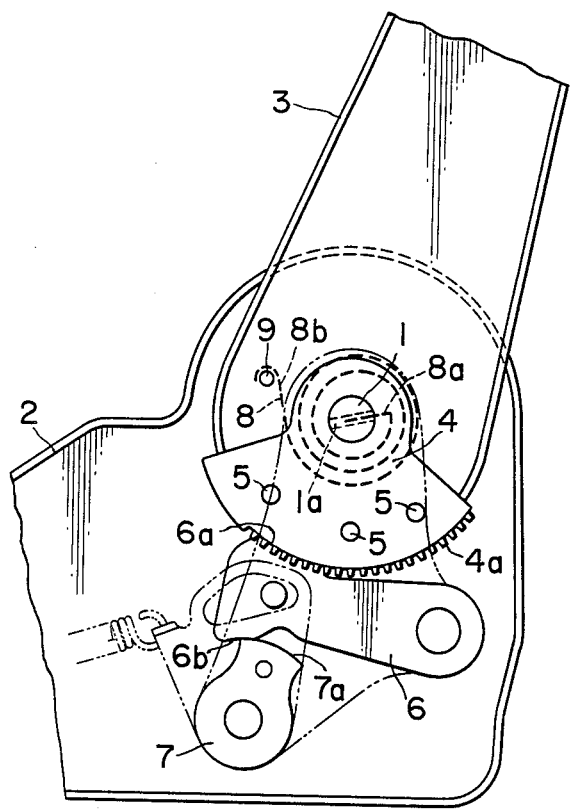
FIG. 4 is a side view illustrating a conventional assembly of a back bracket and a sector gear.

Prior to the description of a preferred embodiment of the present invention, a prior art reclining mechanism will be briefly described with reference to FIG. 4 so that the problems encountered in the conventional reclining mechanisms are more specifically pointed out, whereby the present invention may be more readily understood.

A sector gear 4 is securely joined with three rivet pins 5 to a lower end of a back bracket 3 which is swingable about a pivot pin 1 with respect to a seat bracket 2, and the teeth 4a of the sector gear 4 are in engagement with teeth 6a of a locking pawl 6. A cam surface 6b is formed at the lower surface of the locking pawl 6 and is in wedge-like engagement with a cam surface 7a of a locking cam plate 7 so that the engagement between the sector gear 4 and the locking pawl 6 can be maintained and consequently the back bracket 3 is maintained at a predetermined angle. Furthermore, a spiral coiled spring 8 of rectangular section is so loaded as to bias the back rest to turn forwardly and the inner end 8a of the spiral coiled spring 8 is securely engaged with a groove 1a of the pivot pin 1 while the outer end 8b thereof is made into engagement with a pin 9 extended from the back bracket 3.

In the case of the reclining mechanism of the type described above, when the engagement between the locking pawl 6 and the sector gear 4 is released by shifting an operating handle, the back rest is forced to turn forwardly under the force of the spiral coiled spring 8 and furthermore the rotating moment due to the weight of the back rest is added to accelerate the forward swinging movement of the back rest. In this case, the limited angle of forward swinging movement of the back rest is limited by a stopper. However, there is a fear that the rivet pins are deformed due to the impact exerted to the sector gear when the back rest is stopped by the stopper. In order to overcome such problem, it may be considered to increase the diameter of the rivet pins or the number thereof, but there arises a problem that the cost is increased.

A preferred embodiment of the reclining mechanism in accordance with the present invention will now be described in detail with reference to FIGS. 1, 2 and 3.

Figure 1:
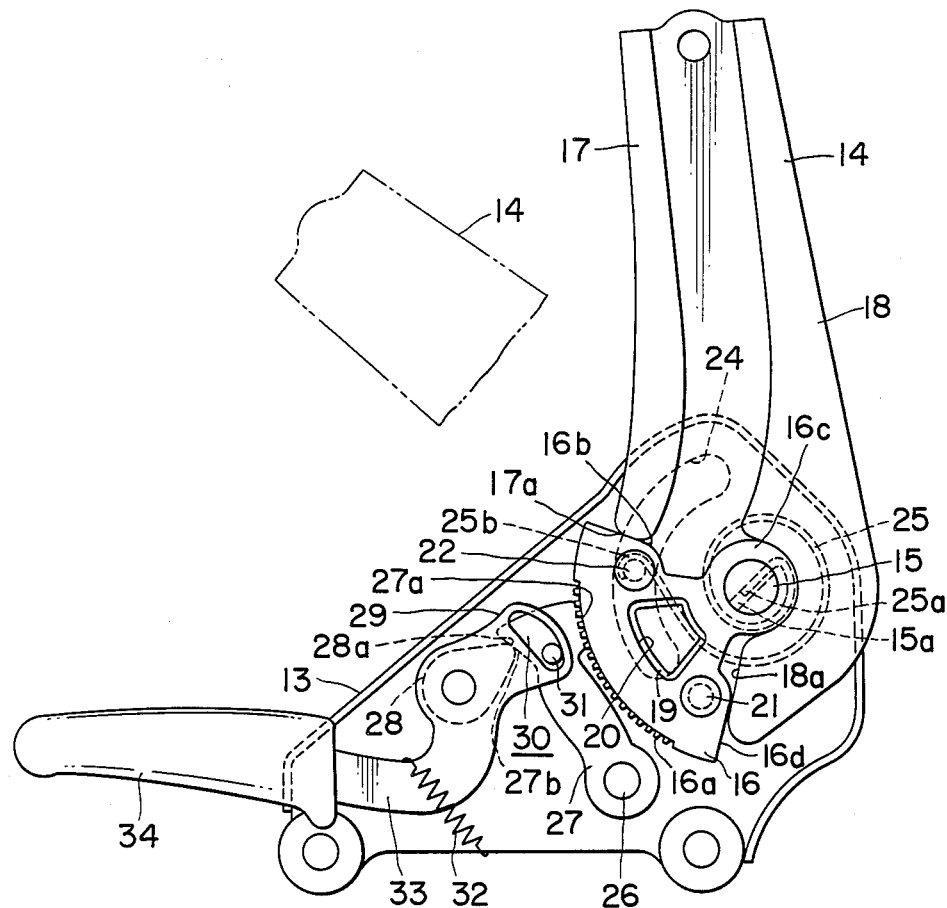
FIG. 1 is a side view of a preferred embodiment of a reclining mechanism in accordance with the present invention.
Figure 2:
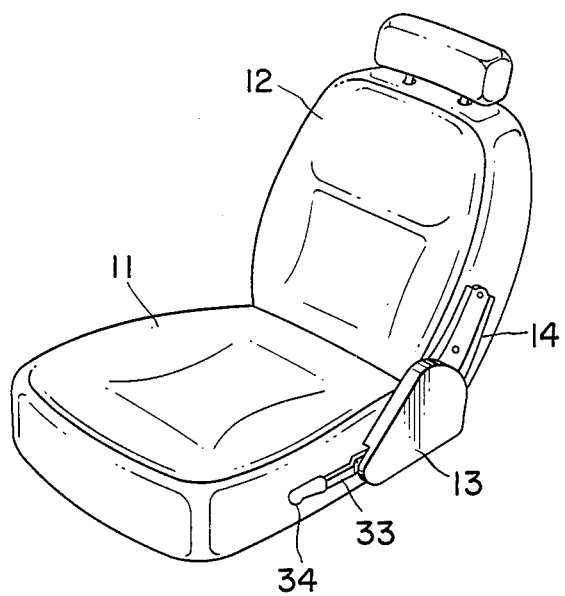
FIG. 2 is a perspective view illustrating a seat in an automotive vehicle incorporating the reclining mechanism in accordance with the present invention.
Figure 3:
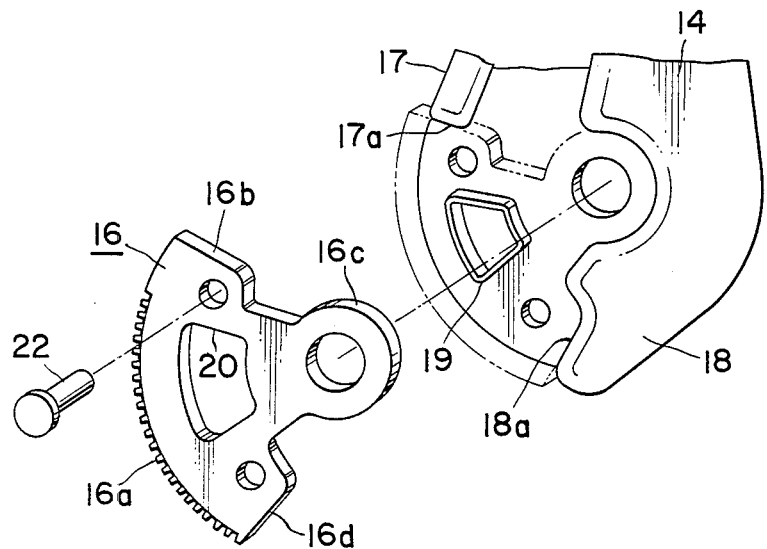
FIG. 3 is an exploded perspective view illustrating the joint of a sector gear to a back bracket in accordance with the present invention.

FIG. 2 is a perspective view illustrating the outer portion of a lefthand seat incorporating the reclining mechanism in accordance with the present invention. In FIG. 2, reference numeral 11 represents a cushion seat; and 12 represents a back rest. A seat bracket 13 is securely attached to a side surface of the cushion seat 11 while a back bracket 14 is securely attached to a side surface of the back rest 12. Both of the brackets 13 and 14 are pivotably connected by a pivot pin 15. As best shown in FIG. 1, a sector gear 16 is securely attached to the lower end of the back bracket 14 in such a way that the center of the pitch circle of a tooth portion 16a of the gear 16 coincides with the center axis of the pivot pin 15.

Next the attachment of the sector gear 16 to the back bracket 14 will be described in detail. The back bracket 14 is fabricated by a partial embossing process so that it has a front raised portion 17 and a rear raised portion 18 both raised relative to middle flat portion. The lower surface 17a of the front raised portion 17 abuts against the side surface 16b of the sector gear 16 while the inner side surface 18a of the rear raised portion 18 abuts against the side surface 16d and an eye 16c of the sector gear 16.

A projection 19 in the form of a square is protruded from the seat bracket 13 and is made into engagement with a rectangular opening 20 formed in the surface of the sector gear 16 between the center of rotation and the tooth portion thereof. The back bracket 14 and the sector gear 16 are securely joined together with a joint pin 21 and a stopper pin 22 on both sides of the opening 20.

The stopper pin 22 is extended inwardly through an arcuate stopper groove 24 which is formed in the seat bracket 13 and whose center of the arc coincides with the axis of the pivot pin 15. The inner end 25a of a spiral coiled spring 25 of rectangular section for biasing the back bracket 14 in the counterclockwise direction in FIG. 2 is inserted into a groove 15a formed at one end portion of the pivot pin 15 while the outer end 25b thereof is engaged with the peripheral surface of the stopper pin 22.

On the side of the seat bracket 13, one end of a locking pawl 27 which is pivotable about a pivot pin 26 is mounted. A toothed portion 27a for engagement with the toothed portion 16a of the sector gear 16 is formed at the upper surface of the leading end portion of the locking pawl 27 and a cam surface 27b for wedge-like engagement with a cam surface 28a of a rocking cam plate 28 is formed at the opposite side of the toothed portion 27a of the locking pawl 17. A release plate 29 is pivotably carried on the seat bracket 13 by the shaft of the locking cam plate 28 and a release pin 31 extended from the locking pawl 27 is loosely fitted into a cam window 30 formed in the release plate 29. A coiled spring 32 is loaded between an operating arm 33 and the seat bracket 13 so that the release plate 29 is biased to rotate in the counterclockwise direction in FIG. 1. The operating arm 33 is joined integral with the release plate 29 and a handle 24 is joined to the leading end of the release plate 29.

Next the mode of operation of the reclining mechanism with the above-described construction will be described below.

When the handle or knob 34 is lifted in order to adjust the angle of inclination of the back rest 12, the release plate 29 is caused to rotate in the clockwise direction as viewed in FIG. 1 so that the locking cam plate 28 is disengaged from the cam surface 27b and a cam surface 30a of the cam window 30 acts on the release pin 31, thereby causing the locking pawl 27 in the counterclockwise direction. As a result, the toothed portion 16a of the sector gear 16 is disengaged from the toothed portion 27a of the locking pawl 27. Then the back bracket 14 is forced to rotate in the counterclockwise direction under the force of the spiral coiled spring 25. When the handle 34 is pushed down and the back rest 14 is turned to a desired angle, the locking cam plate 28 and the release plate 29 are forced to rotate in the counterclockwise direction under the force of the coiled spring 32 and the locking cam plate 28 forces the locking pawl 27 to rotate in the clockwise direction so that the toothed portion 27a of the locking pawl 27 is made into engagement with the toothed portion 16a of the sector gear 16. Thus, the adjustment of the angle of inclination of the back rest is accomplished.

For instance, when a passenger is to ride on an automotive vehicle with two doors and take seat on the rear passenger seat, the back rest of the front seat must be forwardly turned toward the forward end of the stroke of inclination thereof. In this case, when the handle 34 is maintained in the lifted position, the back bracket 14 is forced to turn to the position indicated by the imaginary lines in FIG. 1 under the force of the spiral coiled spring 25 and the stopper pin 22 slides through the stopper groove 24 toward the lower end thereof and is stopped. In this case, the sector gear 16 tends to rotate in relation with the mounting surface of the back bracket 14, but the side surface 16b of the sector gear 16 is made into engagement with the lower surface 17a of the front raised portion 17 while the projection 19 is made into engagement with the opening 20. As a result, the sector gear 16 can be securely held in position relative to the back bracket 14.

As described above, according to the present invention, the mounting surface of the back bracket which is joined to the sector gear is locally subjected to the "deboss processing" to form the raised portion so that the peripheral surface remote from the toothed portion of the sector gear is surrounded by the raised portions. As a result, the back bracket itself can stop the rotation of the sector gear so that the number of joint pins can be reduced as compared with the conventional reclining mechanisms and furthermore the sector gear can be securely held in position relative to the back bracket.

What is claimed is:

1. In a reclining mechanism of the type in which a back bracket is swingably pivoted with a pivot pin to a seat bracket; a sector gear whose center coincides with the axis of said pivot pin is securely attached to said back bracket; and the angle of inclination of a back rest is adjusted by the engagement between the toothed portion of said sector gear and the toothed portion of a locking pawl; the improvement comprising:
   raised portions formed along the peripheral sides of the mounting surface remote from said locking pawl of said back bracket upon which is attached said sector gear in such a way that said raised portions abut against a portion of the circumferential surface of said sector gear;
   means forming a rectangular opening in the surface of the sector gear between its center of rotation and the toothed portion thereof;
   means forming a projection protruding from the back bracket, said projection engaging with the rectangular opening; and,
   said sector gear and said back bracket being securely joined together with joint pins.

* * * * *